United States Patent [19]

Fong et al.

[11] Patent Number: 4,784,754
[45] Date of Patent: Nov. 15, 1988

[54] SULFUR REMOVAL PROCESS

[75] Inventors: Howard L. Fong, Sugar Land; David A. Van Kleeck, Houston, both of Tex.

[73] Assignee: Shell Oil Company, Houston, Tex.

[21] Appl. No.: 91,485

[22] Filed: Aug. 31, 1987

[51] Int. Cl.⁴ .................... E01D 21/00; E01D 21/02
[52] U.S. Cl. .......................................... 209/2; 209/10; 209/12; 210/702
[58] Field of Search .............. 423/234, 573 R; 209/1, 209/2, 10, 12, 13, 15–18; 210/702, 710, 723

[56] References Cited

U.S. PATENT DOCUMENTS 4,191,620  3/1980  Young et al. .................... 423/234
4,243,648  1/1981  Fenton ............................. 423/573 R Primary Examiner—Frank Sever

[57] ABSTRACT

Froth or foam sulfur particle accumulation during the recovery of sulfur particles from a zone containing regenerated redox solution is reduced by agitating and removing the sulfur slurry in a plurality of streams, including at least one stream at a short distance from the top of the solution in the zone and at least one stream from the bottom of the zone and optionally recombining the streams after removal.

23 Claims, 1 Drawing Sheet

SULFUR REMOVAL PROCESS

BACKGROUND OF THE INVENTION

1. Field of the Invention

The present invention is related to a process for removal of sulfur particles from solutions resulting from a redox process for the removal of hydrogen sulfide from a gas stream.

2. Description of the Prior Art

The removal of hydrogen sulfide from liquid and gaseous streams, such as the waste gases liberated or generated in the course of various industrial chemical processes, for example, in the pulping of wood, and in petroleum refining, has become increasingly important in combating atmospheric pollution. Such waste gases not only have an offensive odor, but they may also cause damage and constitute a health hazard. It is now imperative in many localities to remove virtually all of the hydrogen sulfide from waste streams under the penalty of an absolute ban on continuing operation of the plant.

The use of chelated iron redox catalysts for the oxidative removal of hydrogen sulfide from gas streams and conversion of the hydrogen sulfide from gas streams and conversion of the hydrogen sulfide to elemental sulfur is well known in the art. In such processes, a gas stream containing hydrogen sulfide is contacted with an aqueous solution of chelated ferric ion. The solution absorbs the hydrogen sulfide and converts it essentially quantitatively to elemental sulfur. The ferric ion which is reduced to ferrous ion by reaction with the hydrogen sulfide is then regenerated by contacting the solution with a gas containing elemental oxygen, such as air.

In general, these processes employ two separate zones—a first absorber zone for converting the $H_2S$ to solid sulfur by reaction with metal ion and a second oxidizer zone for regenerating the metal ion.

In these and other processes, the solid particulate sulfur is generally removed from the suspension by flotation or by a gravity-sedimentation mechanism such as filtration, centrifugation or the like. Alternatively, the sulfur is heated until it melts and is removed as a liquid. In the latter cases the separation relies upon sulfur's specific gravity of $2.00\pm0.05$ to carry the sulfur down and the aqueous liquid up. The gravity-drawn sedimentation processes can have problems. The solid sulfur can cake and build up in the sedimentation zone. It can plug filter media and generally pose difficulties. Melting the sulfur can also have problems. The high temperature can degrade the chelate solution. Molten sulfur can freeze up and present special handling problems.

When sulfur is suspended by bubbles, the addition of a chemical, such as a surface active agent, adds to the cost and complexity of the process. These chemicals will degrade under sulfur melting conditions resulting in inferior sulfur. Excess surface active agent can also cause foaming. Sulfur coated with organic chemicals is less efficient to handle if filtration is used to recover the sulfur. Mixers are expensive and the moving parts subject to malfunction. Also, large amounts of solution would require further processing.

Accordingly, there is a need for a process to recover sulfur in a gravity-sedimentation process in an efficient, mechanical manner.

SUMMARY OF THE INVENTION

The present invention is directed to a process to remove sulfur particles by a method of sinking sulfur particles from a redox solution, used to remove hydrogen sulfide from a gas stream and prepare sulfur, which comprises: (1) removing sinking sulfur particle slurry from the bottom of the solution in a zone; (2) when at least some of the sulfur particles fail to sink to the bottom of the zone for recovery, agitating the sulfur particles suspended as a froth or foam and removing sulfur particle slurry in a plurality of streams including at least one at a short distance from the top of the solution and at least one stream from the bottom of the solution in the zone; and (3) optionally recombining the streams after removal.

The present invention is useful when it is desired to recover sulfur particles by means of the sulfur particles sinking to the bottom of a zone containing a solution but where a problem is encountered in that some or all of the sulfur particles fail to sink and, thus, accumulate in the upper portion of the zone where they can cake and build up. By use of the process of the invention, sulfur is prevented from accumulating in the upper part of process zones without the need to use surface active agents or the problems of plugging if only simple gravitation methods are used.

In this process, the solid sulfur particles produced by polyvalent metal chelate-catalyzed conversion of hydrogen sulfide are effectively recovered by sinking the sulfur particles but wherein undesirable flotation is produced by entrained hydrocarbon or gas, such as an oxygen-containing gas employed to regenerate the metal chelate catalyst which causes some of the sulfur particles to form a froth or foam which will not sink as desired. Thus, in a process for removing sulfur particles from an aqueous polyvalent metal ion or polyvalent metal chelate solution by a method of sinking said particles in a zone wherein the improvement comprises when at least some of the sulfur particles fail to sink to the bottom of the zone for recovery, also removing sulfur particles in a plurality of streams including at least one stream at a short distance from the top of the solution in the zone and at least one stream from the bottom of the solution in the zone, and optionally recombining the stream after removal. The sulfur particle-gas-liquid froth or foam can be thixotropic in nature and only flow when agitated. Adequate agitation is usually provided by the gas and liquid entering the top of the absorber and separator zones. Additional agitation, if needed, can be obtained by appropriately located mechanical means, e.g., a stirring device, in the zones.

In one embodiment of the invention, the present invention is directed to a process for reducing the froth or sulfur accumulation during the recovery of sulfur from a redox solution, used to remove hydrogen sulfide from a gas stream, which comprises: (1) removing the sinking sulfur particle sulfur slurry from the bottom of the solution in a zone containing the regenerated solution; (2) when sulfur particles fail to sink to the bottom of the zone for recovery, agitating the sulfur particles suspended as a froth or foam and removing sulfur particle slurry in a plurality of streams, including at least one stream at a short distance from the top of the solution in the zone and at least one stream from the bottom of the zone; and (3) optionally recombining the streams after removal.

In another embodiment, the invention is directed to a process for the removal of hydrogen sulfide from a sour gas stream which comprises: (1) contacting the gas stream with a redox solution below the melting point of sulfur to produce a sweet gas stream and a reduced solution; (2) removing the reduced solution from the contacting zone, optionally in a plurality of streams, including at least one stream at a short distance from the top of the gas-liquid interface and at least one stream from the bottom of the zone; (3) regenerating the (combined streams of) solution to produce an admixture of regenerated solution and sulfur; (4) removing the sinking sulfur from the bottom of the separator zone; (5) when sulfur particles fail to sink, agitating the sulfur particles suspended as a froth or foam and removing sulfur particle slurry from the separation zone in a plurality of streams, including at least one stream at a short distance from the top of the gas-liquid interface in the zone and at least one stream from the bottom of the separation zone; and (6) optionally recombining the streams after removal. Regenerated redox solution is optionally returned to the contacting zone.

Thus, it has now been found that sulfur values can be recovered from a hydrogen sulfide-containing gaseous stream with high efficiency by the process of (a) contacting the hydrogen sulfide-containing gaseous stream with an aqueous solution of a water-soluble oxidized polyvalent metal chelate catalyst at neutral or alkaline pH thereby converting a substantial portion of the hydrogen sulfide to particulate elemental sulfur and reducing the polyvalent metal chelate catalyst and forming a suspension of particulate elemental sulfur in the aqueous solution and a product gas stream depleted in hydrogen sulfide; (b) contacting the suspension with oxygen-containing gas in an oxidation zone under flotation conditions thereby oxidizing the polyvalent metal chelate to its oxidized form and forming a regenerated aqueous solution and an aqueous liquid slurry phase containing the oxidized polyvalent metal chelate catalyst and an undesirable sulfur particle-gas-liquid foam or froth slurry phase; (c) separating the foam or froth phase from the aqueous liquid phase by agitating the froth or foam and removing sulfur slurry in a plurality of streams including at least one stream of relatively high foam concentration sulfur particle slurry at a short distance from the top of the solution in the zone and at least one stream of relatively high aqueous concentration sulfur particle slurry from the bottom of the separation zone; and, optionally, (d) recycling at least a portion of the aqueous liquid slurry phase to the contacting step of (a), and (e) optionally recombining the streams removing in step (c) and recovering elemental sulfur from one or more of the removed streams.

Thus, when sulfur particles fail to sink to the bottom of the zone, one can then switch completely or partly to removal of sulfur particles from at least one stream a short distance from the top of the zone. Alternatively, bottom and top streams can operate at the same time. The goal is to prevent accumulation of sulfur in the process by essentially removing sulfur particle slurry from the redox solution at a rate equal to the amount of sulfur values entering the zone. Sulfur in a sedimentation (sinking) process concentrates as sulfur particle slurry at the bottom of the vessel or zone as desired. When some or all of the sulfur particles fail to sink, sulfur is concentrated (accumulated) as sulfur particle slurry near the top of the vessel or zone. This means that the middle area contains the most dilute solution of sulfur particles. The present invention provides a mechanical means to recover sulfur particles from the solution in the vessel or zone in a plurality of streams rather than trying to force froth or foam sulfur particle slurry to sink as has been previously attempted.

In the present invention, as has been noted above, the plurality of streams for the withdrawal of sulfur particle slurry can be in either the absorber or the separator or both. In an optional but very practical aspect of the present invention, the plurality of streams from the absorber zone are combined and sent to the regenerator zone.

In a preferred embodiment of the invention, the streams are withdrawn in a continuous manner and, preferably, simultaneously from each zone. Each zone is operated independently of the other zone as required but one optimum operation would anticipate that the two zones would operate simultaneously and continuously. Alternatively, the streams are withdrawn from a zone intermittently, for example, in a pulsing manner and at a flow rate high enough to prevent sulfur from plugging the lines.

The plurality of streams withdrawn from the separator zone are optionally combined and sent to further processing in, e.g., a melter or concentration with a vacuum filter or the like to recover solid sulfur.

Basically, the spent redox solution, together with the sinking sulfur that is formed, is taken off the bottom of the absorber separator zone on level control. A constant bleed is also taken higher up in the vessel, a short distance below where the gas-liquid interface is normally controlled. The intention is not necessarily to withdraw the sulfur particle froth slurry right at the interface in the zone, but rather a means to prevent sulfur particle froth slurry from accumulating at the top and gradually building downward in the vessel but not sinking so that it cannot be withdrawn from the bottom of the zone as conventionally planned.

The bottom offtake and the sidedraw bleed are combined and sent to the regenerator. In the surge/thickener zone or vessel, the same arrangement is made as in the absorber phase separator zone. A small slip stream from the bottom as well as a bleed stream from a manifolded sidedraw arrangement some short distance from the gas-liquid interface are combined and sent either directly to a melter or to a further concentration step. If further concentration is desired, a vacuum filter is preferred. Concentration via devices that rely on the gravity difference between sulfur and the solution, such as hydroclones and centrifuges, are less preferred because of the presence of floating sulfur.

The particular type of gaseous stream treated is not critical, as will be evident to those skilled in the art. Streams particularly suited to removal of $H_2S$ by the practice of the invention are, as indicated, naturally occurring gases, synthesis gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$ and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The H₂S content of the type of streams contemplated will vary extensively, but, in general, will range from about 0.1 percent to about 10 percent by volume. Obviously the amount of H₂S present is not generally a limiting factor in the practice of the invention.

The temperatures employed in the contacting zone are not generally critical, except that the reaction is carried out at a temperature below the melting point of sulfur. In many commercial applications, such as the removal of H₂S from natural gas to meet pipeline specifications, contacting at ambient temperatures is desired. In general, temperatures of from 10° C. to 80° C. are suitable, and temperatures from 20° C. to 45° C. are preferred. Contact times may range from about 0.5 second to about 270 seconds or longer, with contact times of 1 second to 120 seconds being preferred.

Similarly, in the regeneration zone, temperatures may be varied widely. Preferably, the regeneration zone should be maintained at substantially the same or, preferably, a lower temperature than the absorption zone. In general, temperatures of from about 10° C. to 80° C., preferably 20° C. to 45° C., may be employed.

As used herein, the term "oxygen" includes oxygen-containing gases, air or air-enriched with oxygen. The oxygen oxidizes the reduced metal ions or the metal of the chelate or chelates to a higher valence state, and the regenerated mixture is returned to the contact zone. The oxygen (in whatever form supplied) is supplied in a stoichiometric equivalent or excess with respect to the amount of reactant present in the mixture. Preferably, the oxygen-containing gas is supplied in an amount of from about 1.2 to 5 times the stoichiometric requirement.

In accord with this invention a solution of a polyvalent metal in chelate form is contacted with the hydrogen sulfide-containing gas. The chelate solution, per se, does not constitute the present invention and may be selected from among the chelate solutions taught by the art to be useful in sulfur oxidation processes.

The metals which may be employed are those polyvalent metals which will oxidize hydrogen sulfide to sulfur and in turn be reoxidized by oxygen or similar gas. These metals are used with proper adjustment in concentration so that the algebraic sum of the single electrode potentials render the reaction thermodynamically possible.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

The chelating agents or liquids which may be used in conjunction with polyvalent metallic cations are those which form a complex ion having stability in solution. These compounds may be of any substance which will effectively complex the metal ion by forming cyclic structures.

These materials include aminopolycarboxylic acid chelating agents of the alkylenediamine and phenylenediamine types, such as ethylenediamine tetracetic acid, nitrilotriacetic acid, or the like. They may also contain ammonia or an aliphatic, alicyclic, or heterocyclic primary or secondary amine.

Specific, nonlimiting examples of aminopolycarboxylic acids include diglycine, hydroxyethyldiglycine, nitrilotriacetic acid, carboxylic acid derivatives of ethylenediamine, diethylene triamine, 1,2-propylenediamine, and 1,3-propylenediamine, such as ethylenediamine tetracetic acid (EDTA), 2-hydroxyethyl ethylenediamine triacetic acid (HEDTA), diethylenetriamine pentacetic acid (DETPA), and carboxylic acid derivatives of cyclic 1,2-diamines such as 1,2-diaminocyclohexane-N,N-tetracetic acid, and 1,2-phenylenediamine-N,N-tetracetic acid. Salts of these acids, such as alkali metal salts, may also be used.

The amount of Fe(III) contacted with the H₂S-containing gas must be at least the amount required to react with the H₂S. It must be kept in mind that the dissolved iron is continuously being reoxidized to Fe(III) so that the amount of Fe(III) required is essentially a catalytic amount. The rate at which Fe(II) is oxidized to Fe(III) depends upon temperature, agitation, contact time and other factors. The total Fe(III) present as a combination of fed Fe(III) and Fe(II) generated by reoxidation should be at least the amount required to react with the sulfide and mercaptans and preferably is from about 125 to 400% of the amount required to react.

The system is usually run neutral to somewhat basic. This is controlled by adding caustic, such as KOH, NaOH, or NH₄OH or the like, in controlled amounts. It is preferred to maintain the pH at from about 6 to about 10, more preferably pH 7.0 to 8.5.

Additional descriptions of typical chelate systems and their use may be found in the following patents: U.S. Pat. No. 4,401,642; U.S. Pat. No. 4,393,037; U.S. Pat. No. 4,390,516; U.S. Pat. No. 4,315,403; U.S. Pat. No. 4,206,194; and U.S. Pat. No. 4,083,945. Other disclosures of interest can be found in U.S. Pat. No. 3,097,925 issued to Pitts Jr., et al, on July 16, 1963; U.S. Pat. No. 3,068,065 issued to Hartley, et al, on Dec. 11, 1962; U.S. Pat. No. 4,278,646, issued to Lynn, et al, on July 14, 1981; U.S. Pat. No. 4,036,942 issued to Sibeud, et al, on July 19, 1977; U.S. Pat. No. 3,933,993 issued to Salemme on Jan. 20, 1976; and U.S. Pat. No. 4,009,251, issued to Meuly on Feb. 22, 1977.

Preferred reactant materials are coordination complexes in which polyvalent metals form chelates with an acid having the formula

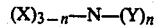

$$(X)_{3-n}-N-(Y)_n$$

wherein n is a whole number from 1 to 3; Y is an acetic acid or propionic acid group; X is 2-hydroxy ethyl, 2-hydroxy propyl, or an alkyl group having from one to four carbon atoms, or

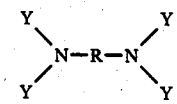

$$\begin{array}{c} Y \diagdown \qquad \diagup Y \\ N-R-N \\ Y \diagup \qquad \diagdown Y \end{array}$$

wherein from two to four of the groups Y are selected from acetic and propionic acid groups; from zero to two of the groups Y are selected from 2-hydroxy ethyl and, 2-hydroxy propyl; and R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate metal salt, oxide or hydroxide of the polyvalent metal and the chelating agent in the acid form or an alkali metal or ammonia salt thereof. Exemplary chelating agents include amino acetic derived from ammonia or 2-hydroxy alkyl amines, such as glycine, diglycine (imino diacetic acid), NTA (nitrilotriacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA) (2-hydroxy ethylethylene diamine triacetic acid), DETPA (diethylene tramine pentaacetic acid); amino acetic acid derivatives of cyclic 1,2-diamines, such as 1,2-diamino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. The ion chelates of NTA and 2-hydroxyethyl ethylene diamine triacetic acid are preferred.

Pressure conditions in the contacting or absorption zone may vary widely, depending on the pressure of the gas to be treated. For example, pressures in the contact zone may vary from 1 atmosphere up to 150 or even 200 atmospheres. Pressures of from 1 atmosphere to about 100 atmospheres are preferred. In the regeneration or desorption zone or zones, pressures may be varied considerably, and will preferably range from about 1 atmosphere absolute to about 3 or 4 atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, which disclosures are incorporated herein by reference. Preferably, if the iron chelate of nitrilotriacetic acid is used, pH in the process of the invention will range from about 6 to about 8.0, and the molar ratio of the nitrilotriacetic acid to the iron is from about 1.0 to 1.4. The procedure is preferably conducted continuously.

As indicated, the $H_2S$, when contacted, is quickly converted by the polyvalent metal ions, polyvalent metal chelate, etc., to elemental sulfur. The amount of polyvalent metal compound, polyvalent metal chelate, or mixtures thereof, supplied is an effective amount, i.e., an amount sufficient to convert all or substantially all of the $H_2S$ in the gas stream, and will generally be on the order of at least 2 mols per mol of $H_2S$. Ratios of from about 2 mols to about 15 mols of polyvalent metal compound or chelate per mol of $H_2S$ may be used, with ratios of from about 2.5 mols per mol to about 8 mols of polyvalent metal compound or chelate per mol of $H_2S$ being preferred. The manner of preparing the aqueous solution or admixture is a matter of choice. The polyvalent metal ion or polyvalent metal chelate solution will generally be supplied as an aqueous solution having a concentration of from about 0.1 molar to about 2.0 molar.

While it is desirable to recover sulfur by mechanical means, in some instances it can be desirable to add, preferably less than the usual amount of, conventional chemicals known in the art to aid in sulfur recovery, including wetting agents or surfactants and higher alkanols. Higher alkanols are compounds having the formula $C_nH_{2n+1}OH$, in which n is a whole number from 4 through 18, and mixtures thereof, may be used in extracting or removing the sulfur from the aqueous admixture or slurry. Useful compounds are t-butanol, n-pentanol, n-octanol, n-decanol, n-undecanol, n-dodecanol, and mixtures thereof. Preferably, the compounds employed are those wherein n is a whole number from 8 through 12, and mixtures thereof. The compound or compounds are supplied in an amount sufficient to remove at least the bulk of the sulfur from the slurry or admixture and form a separate phase comprising sulfur and the compound or mixture of compounds. Because the amount of the compound, or mixture of compounds, required is dependent on the amount of sulfur produced, which is, in turn, dependent on the concentration of $H_2S$ in the gas stream treated, precise amounts of the compounds cannot be given. Those skilled in the art may adjust the amount, as required. In general, the amount will range from about a few ppm to about 0.1 percent (by volume, based on the volume of the polyvalent metal chelate solution in contact therewith), with an amount of 5 ppm to about 100 ppm by volume being preferred.

Any wetting agent or surfactant can be used which effectively wets the sulfur particles or reduces the surface tension or decreases the contact angle against the sulfur when dissolved in water or aqueous solutions. These include nonionic as well as cationic and anionic agents, such as those prepared by treating a higher alcohol or carboxylic acid or phenolic compound with ethylene oxide or the like, or soaps, sodium or ammonium alkyl or alkyl-aryl sulfates and sulfonates, quaternary amine halides and the like which are generally known in the art as in U.S. Pat. Nos. 3,907,422 and 4,374,104.

In the event of chemical degradation and loss of chelating agent such as aminopolycarboxylic acid, additional replacement chelating agent can be added or process conditions adjusted in any appropriate manner known in the art.

For example, British Pat. No. 999,799 discloses close adjustment of pH to avoid breakdown of the chelate complex. British Pat. No. 999,800 discloses control of the regeneration of the catalyst solution to avoid overoxidation of the iron chelate. U.S. Pat. No. 4,189,462 discloses the restricting the molar ratio of EDTA to iron is an important consideration in avoiding breakdown of the chelate molecule. U.S. Pat. No. 4,330,4789 discloses the use of specific types of aliphatic polycarboxylic acid chelating agents that are more resistant to oxidation. U.S. Pat. No. 3,622,273 discloses the addition of selected buffering agents to maintain the pH at a relatively high level at which the chelated iron complex is said to be more stable. U.S. Pat. No. 4,278,646 discloses the addition of selected amine salt stabilizers to achieve chelate stability at low pH levels. U.S. Pat. Nos 4,382,818; 4,388,293; and 4,400,368 disclose the addition of various sulfur-containing and nitrogen-containing compounds as stabilizers to reduce the rate of chelate degradation. U.S. Pat. No. 4,622,212 discloses degradation inhibitors selected from alkaline thiosulfates and dihydroxy alcohols of 2 or 3 carbon atoms.

BRIEF DESCRIPTION OF THE DRAWINGS

In order to illustrate the invention with greater particularity, reference is made to the accompanying drawing.

ILLUSTRATIVE EMBODIMENT

Figure 1:
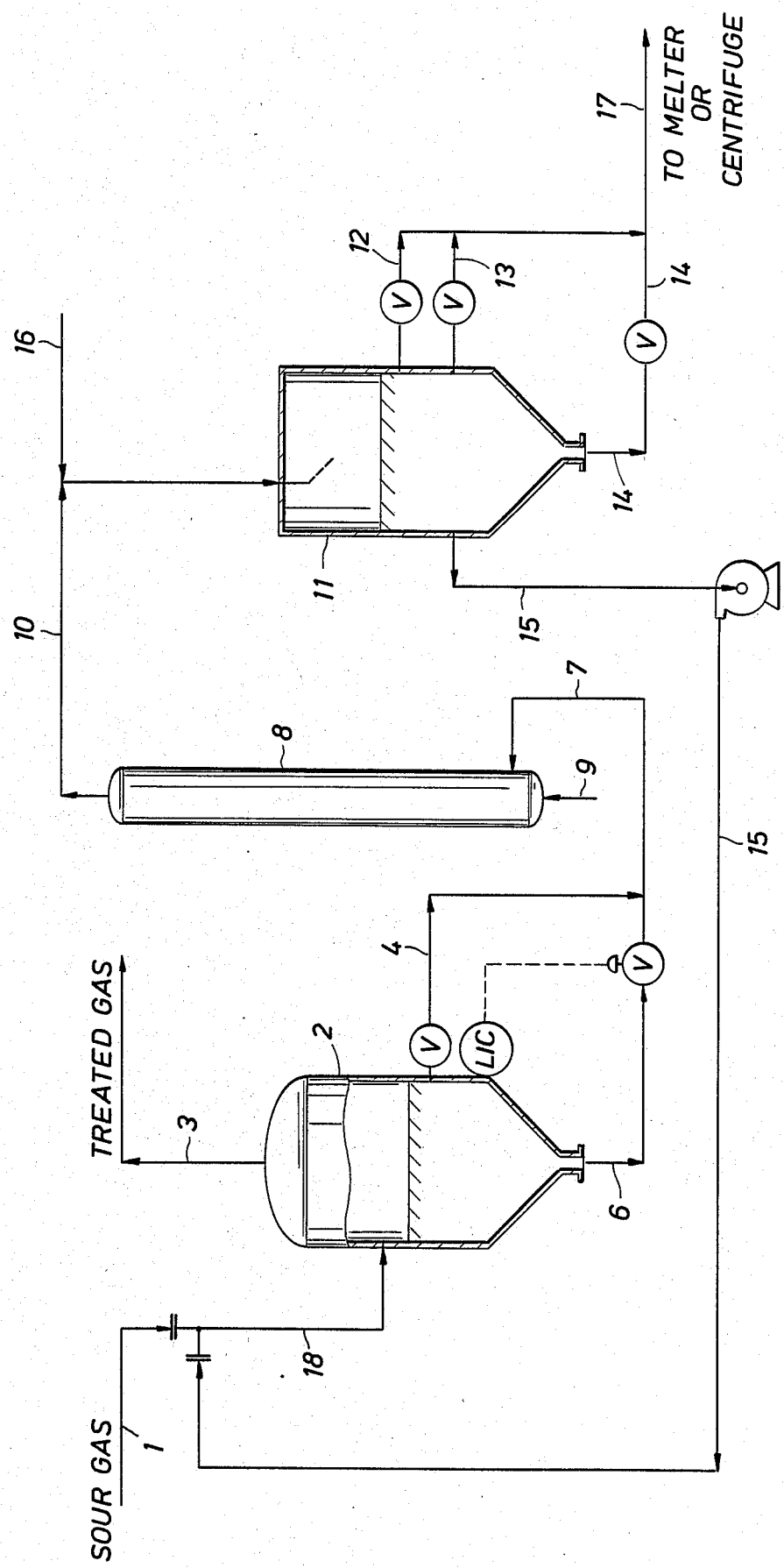
FIG. 1 illustrates a schematic representation of a process for the removal of hydrogen sulfide from a gas stream using a redox solution with the production of sulfur in the regeneration of the solution in which sulfur accumulation in the contacting and separation zones by removing sulfur slurry from near the solution surface and the bottom of the zones.

With reference to FIG. 1, a gas stream, such as a natural gas stream containing 1 percent $H_2S$ and 1.5 percent $CO_2$ by volume, enters via line 1 into contactor zone 18. Contactor zone 18 is a pipeline contactor, although any suitable contacting device (such as a venturi) may be employed. Gas/liquid separation is effected in absorber separator 2. For example, while it is possible to use various solvents of the art, an aqueous solution of a polyvalent metal ion or polyvalent metal chelate is preferred. Of the various redox solutions known in the art, a preferred redox solution of the invention is an Fe(III) chelate solution, such as Fe(III) chelate of N-(2-hydroxyethyl)ethylenediamine or Fe(III) chelate of nitrilotriacetic acid.

An oxidizing reactant mixture, e.g., an aqueous mixture containing 0.4 molar Fe(III) as the complex of nitrilotriactic acid, enters contactor zone 18 via line 15. For illustrative purposes, it will be assumed that the gaseous stream enters at 200 MSCF per hour, while the reactant mixture enters at 5 M gallons per hour. Pressure of the gas in line 1 is 1000 PSIG, and the temperature of the gas is 3020 C. Reactant mixture is supplied at a temperature of 30° C. and contact time is 1 second. The flow of liquid and gas, as illustrated, provides for good contact and reaction of the $H_2S$ in the stream to sulfur. As will be understood by those skilled in the art, water and the Fe(II) complex of chelate of nitrilotriacetic acid are also produced by the reaction. Sweet gas is removed overhead via line 3.

Partially spent iron chelate solution exits the absorber separator 2 via lines 4 and 6. A sensing element in the lower portion of 2 is used to send a pneumatic signal to the control valve in line 6. The combined admixture from lines 4 and 6 enters regenerator zone 8 which comprises a vertical contactor column. Air or other $O_2$-rich gas from line 9 at a flow rate of 8000 standard cubic feet per hour enters column 8 through spargers near the bottom of the column. An admixture, i.e., admixture of partially spent air and solution in which the bulk of the Fe(II) chelate has been oxidized to the Fe(III) chelate is produced as a foam or froth slurry which is removed overhead via line 10.

The foam or froth, which is a slurry-like mixture of sulfur and regenerated admixture, is introduced via line 10 into separator zone 11. Optionally, prior to entry into unit 11, a chemical stream of surface-active agent or higher alkanol is added in such a fashion, e.g., via line 16, that good mixing of the froth and the chemical occurs. In-line mixing may be used, or a suitable mixing device may be provided, if desired. For example, a static mixer, or mixing devices provided with impellers may be used. The chemical may, of course, be added in separator zone 11, and the chemical, if used, is approximately less than 1% by volume based on the aqueous admixture and usually only a few ppm. The combination of the chemical and intimate mixing helps break the froth.

In zone 11, the mixture is allowed to begin to separate into an upper foam or froth layer or phase and a lower aqueous slurry layer or phase. Since a substantial amount of the sulfur sinks with or without the addition of chemicals, it sinks into the lower phase. The various phases of sulfur slurry are removed via lines 12, 13, and 14 either continuously or intermittently. These streams are combined in line 17 and fed to an optional recovery zone, such as a melter or concentrator, preferably a vacuum filter. The somewhat clarified regenerated solution is recycled to the contactor via line 15.

Surprisingly, use of the process of the invention provides a simple, mechanical means of recovering sulfur from slurries thereof and the reducing of frothing or sulfur accumulation often associated with such processes in which little or, preferably, no chemicals are added.

While the invention has been illustrated with particular apparatus, those skilled in the art will appreciate that except where specified, other equivalent or analogous units may be employed. The term "zones," as employed in the specification and claims, includes, where suitable, the use of segmented equipment operated in series, or the division of one unit into multiple units because of size constraints, etc. For example, a contacting or absorption column might comprise two separate columns in which the solution from the lower portion of the first column would be introduced into the upper portion of the second column, the gaseous material from the upper portion of the first column being fed into the lower portion of the second column. The thickening and surging can occur in separate vessels, etc. Parallel operation of units is, of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives such as sodium oxalate, sodium formate, sodium thiosulfate, and sodium acetate, which may be beneficial and U.S. Pat. No. 4,622,212 describes stabilizing agents such as alkaline thiosulfates and dihydroxy lower alkanols.

What is claimed is:

1. A process comprising removing sulfur particles from an aqueous polyvalent metal ion or polyvalent metal chelate solution by a method of sinking said particles in a zone, when at least some of the sulfur particles fail to sink to the bottom of the zone for recovery, agitating the sulfur particles suspended as a froth or foam and removing sulfur particles in a plurality of streams including at least one stream at a short distance from the top of the solution in the zone and at least one stream from the bottom of the solution in the zone, and optionally recombining the streams after removal.

2. A process according to claim 1 wherein the top and bottom slurries are withdrawn from the absorber zone, the separator zone or both zones.

3. A process according to claim 2 wherein the top and bottom slurries are withdrawn continuously.

4. A process according to claim 3 wherein the top and bottom slurries are withdrawn intermittently.

5. A process according to claim 1 wherein the chelate is the Fe(III) chelate of N-2-hydroxyethyl) ethylenediamine triacetic acid.

6. A process according to claim 1 wherein the chelate is the Fe(III) chelate of nitrilotriacetic acid.

7. A process according to claim 1 wherein the top and bottom slurries are withdrawn from the separator zone.

8. A process according to claim 1 wherein the top and bottom slurries are removed from both the absorber and the separator zone.

9. A process according to claim 8 wherein the top and bottom slurries are withdrawn continuously.

10. A process according to claim 9 wherein the top and bottom slurries are withdrawn intermittently.

11. A process comprising: removing sulfur particles by a method of sinking sulfur particles from an aqueous polyvalent metal ion or polyvalent metal chelate sulfur redox solution, used to remove hydrogen sulfide from a gas stream and prepare sulfur, by (1) removing sinking sulfur slurry from a stream at the bottom of a redox solution in a zone; (2) when sulfur particles fail to sink to the bottom of the zone for recovery, agitating the sulfur particles suspended as a froth or foam and removing sulfur particles in a plurality of streams including at least one stream at a short distance from the top of the solution in the zone and at least one stream from the bottom of the solution in the zone; and (3) optionally recombining the streams after removal.

12. A process according to claim 11 wherein the solution is withdrawn from the contacting zone and in a plurality of streams, including at least one stream at a short distance from the top of the gas-liquid interface and at least one stream from the bottom of the zone, are combined prior to use in the next step of the process.

13. A process according to claim 12 wherein the top and bottom slurries are withdrawn continuously.

14. A process according to claim 13 wherein the top and bottom slurries are withdrawn intermittently.

15. A process according to claim 11 wherein the chelate is the Fe(III) chelate to N-(2-hydroxyethyl) ethylenediamine triacetic acid.

16. A process according to claim 11 wherein the chelate is the Fe(III) chelate of nitrilotriacetic acid.

17. A process according to claim 11 wherein the regenerated redox solution is recycled to the contacting zone.

18. A process comprising reducing the froth or sulfur accumulation during the recovery an aqueous polyvalent metal ion or polyvalent metal chelate redox solution used to remove hydrogen sulfide from sulfur from the bottom of a gas stream by (1) removing the sinking sulfur slurry from a zone containing the regenerated redox solution; (2) when all the sulfur particles fail to sink, agitating the sulfur particles suspended as a froth or foam and removing sulfur particles in a plurality of streams, including at least one stream at a short distance from the top of the solution in the zone, and at least one stream from the bottom of the zone; and (3) optionally recombining the streams after removal.

19. A process according to claim 18 wherein the top and bottom slurries are withdrawn continuously.

20. A process according to claim 18 wherein the top and bottom slurries are withdrawn intermittently.

21. A process according to claim 18 wherein the chelate is the Fe(III) chelate to N-(2-hydroxyethyl)ethylenediamine triacetic acid.

22. A process according to claim 18 wherein the chelate is the Fe(III) chelate of nitrilotriacetic acid.

23. A process for the removal of hydrogen sulfide from a sour gas stream which comprises: (1) contacting the gas stream with an aqueous polyvalent metal ion or polyvalent metal chelate redox solution below the melting point of sulfur to produce a sweet gas stream and a reduced solution; (2) removing the reduced solution from the contacting zone, optionally in a plurality of streams; (3) regenerating the combined streams of solution to produce an admixture of regenerated solution and sulfur; (4) removing the sinking sulfur from the bottom of the separator zone; (5) when sulfur particles fail to sink agitating the sulfur particles suspended as a froth or foam and removing sulfur particle slurry from the separation zone in a plurality of streams, including at least one stream at a short distance from the top of the gas-liquid interface in the zone and at least one stream from the bottom of the zone; and (6) optionally recombining the streams after removal

* * * * *